United States Patent [19]
West

[11] Patent Number: 6,000,107
[45] Date of Patent: Dec. 14, 1999

[54] FASTENING DEVICE

[76] Inventor: Stephen W. West, 137 Clair, Mt. Clemens, Mich. 48045

[21] Appl. No.: 09/153,583

[22] Filed: Sep. 15, 1998

[51] Int. Cl.⁶ .................................. A41F 1/00; B42F 1/00; F16G 11/00
[52] U.S. Cl. .................................. 24/453; 24/3.13; 24/459
[58] Field of Search ........................... 24/453, 459, 522, 24/593, 596, 686, 716, 3.13

[56] References Cited

U.S. PATENT DOCUMENTS

| | | | |
|---|---|---|---|
| 1,978,087 | 10/1934 | Johnson | 24/453 |
| 2,062,057 | 11/1936 | Hobby | 24/453 |
| 2,862,267 | 12/1958 | Parkin | 24/453 |
| 3,164,054 | 1/1965 | Biesecker . | |
| 3,392,729 | 7/1968 | Lenoir | 24/3.13 |
| 4,757,662 | 7/1988 | Gasser | 24/459 |
| 5,428,872 | 7/1995 | Paparian et al. | 24/103 |
| 5,692,272 | 12/1997 | Woods | 24/459 |

FOREIGN PATENT DOCUMENTS 0951616  3/1964  United Kingdom ............ 24/453

*Primary Examiner*—Victor N. Sakran
*Attorney, Agent, or Firm*—Lynn E. Cargill; Mary H. Powell

[57] ABSTRACT

An improved fastening device is flush-mountable and provides a means for flush-mount fastening a sheeted material to a surface. The flush-mounted fastening device minimizes distraction from an attractive exterior surface. A flush-mounted receiving means embedded in the surface receives a plunger pin which is attached to and extends through the sheeted material so that the sheeted material may be fastened by a means which is flush with the surface.

18 Claims, 5 Drawing Sheets

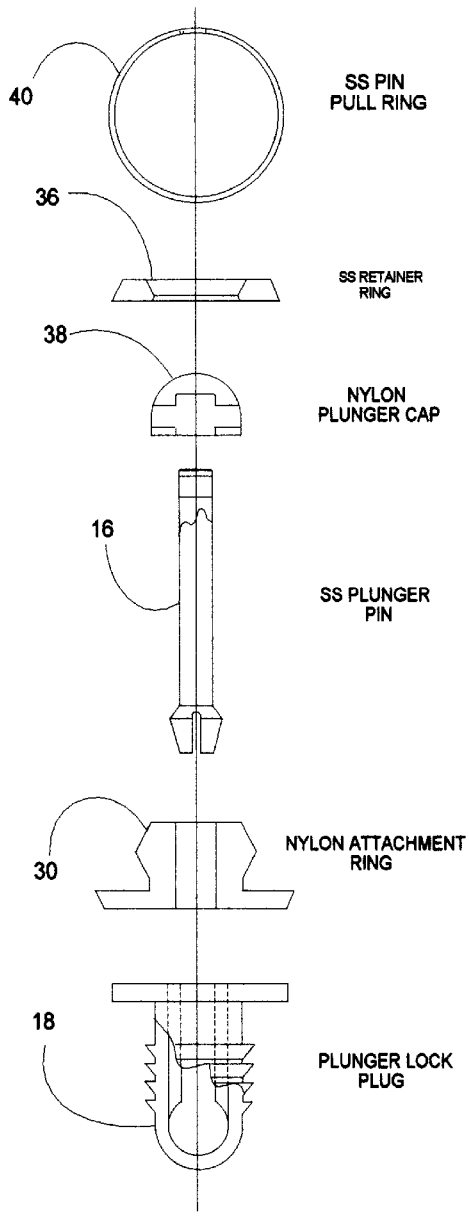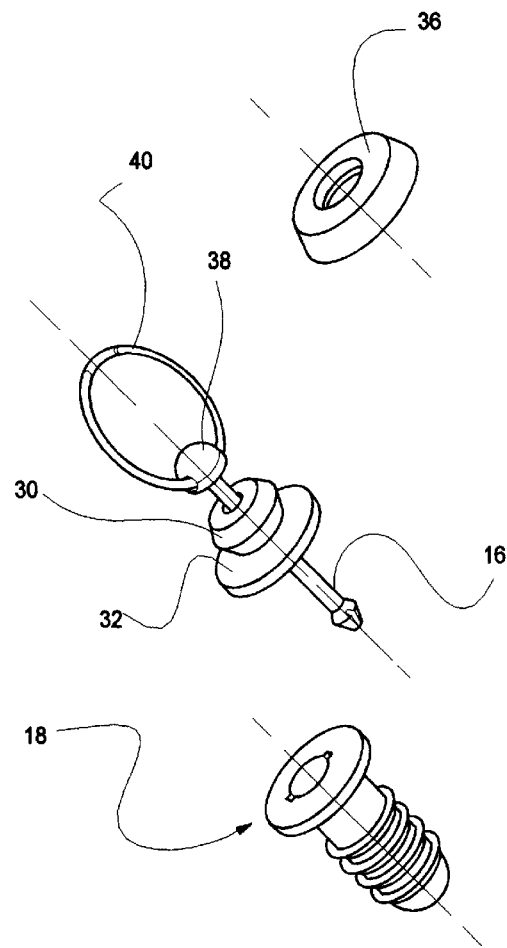
FIG 2a
FIG 2b

FASTENING DEVICE

TECHNICAL FIELD

The present invention relates generally to a means for flush-mount fastening a sheeted material to a surface. More specifically, the fastener of the invention is particularly suited for fastening a sheeted material to a boat hull, in addition, it has other uses and is adapted for use with other materials and other surfaces. The invention is adaptable for use with objects which routinely are covered with a tarp or other protective covering, including, while not limited to, barbecue grills, outdoor equipment, exterior architectural structures, motorcycles, patio and garden furniture and lawn care items. It is convenient to describe the invention with particular reference to sheeted materials such as a protective boat canvas and the surface of a boat hull.

BACKGROUND OF THE INVENTION

The exterior appearance of boats is of such importance to boaters that millions of dollars are spent annually on customized paint jobs and other exterior appearance enhancements. Current technology for attaching a canvas to a boat generally includes fasteners extending upward or outward from the painted exterior surface of the boat. Traditionally, the fastening devices are unsightly stainless steel snap locks and similar, disparaging the exterior appearance of an otherwise attractive boat. Thus, ironically, a canvas which has the purpose of protecting a boat's customized painting is generally attached to the boat by fasteners which have the impact of disturbing the desired sleek appearance of the boat's exterior appearance. A problem, to which the present invention presents a solution, is that current fasteners extend upward from the surface and interfere with the exterior appearance of the boat. A flush-mounted fastening system which securely fastens canvas while minimizing interference with the intended appearance of the surface is desired.

Prior art teachings, for example U.S. Pat. No. 3,164,054, issued to Donald L. Biesecker, assignor, on Jan. 5, 1965, discloses a fastener including a bushing with a rib and shoulder means adapted to be applied to an apertured workpiece. Such a bushing means is suitable for connecting a first workpiece or article of manufacture with a second apertured workpiece. The bushing fastener, however, does not disclose a means for attaching a fastening device to a surface for the purpose of securing a sheeted material to a workpiece or surface. Also, the bushing fastener is not continuously flush-mounted because the bushing fastening device has a converging surface which does not remain stationary. In addition, the security of the bushing fastener is limited because a workpiece is secured primarily by convergence and a groove section. The groove section may require a special design in a workpiece or may restrict the nature of the surface and limit the width of the surface. Further, the bushing fastener is slotted, thereby increasing the risk that the bushing may "tear away" from a workpiece. Still further, the bushing fastener does not provide for the release of water which may collect in the bushing. During winter storage, any collected water might freeze, expand and destroy such a fastener.

Accordingly, it is a primary object of the present invention to provide a fastening device for attaching a protective sheet material to a surface. This is especially useful for attaching a canvas to a boat hull. Having as its fundamental design criteria of being flush-mounted, the present invention has an advantage over current technology. The present invention permits a sheeted material to be attached to a surface, such as a canvas to be attached to a boat, without disturbing the exterior appearance of the boat because the flush-mounted fastening device does not "break" the lines or continuity of color of an attractively painted surface. This is essentially a flush-mounted fastening device, most notably to be used in the marine industry for securely fastening canvas and other materials to a boat hull or other painted surface.

SUMMARY OF THE INVENTION

In accordance with a preferred embodiment of the invention, these and other objects and advantages are addressed as follows. A flush-mounted fastening device capable of securing a sheeted material 12 to a surface 14 is disclosed, wherein the fastening device includes a sheeted material holding means 10, a plunger pin 16 attached to and extending through the sheeted material holding means 10, and a flush-mounted receiving means 8 embedded in the surface 14 and used for receiving the plunger pin 16 so that the sheeted material 12 may be fastened to the surface 14. Disclosed are various means of securing the plunger pin 16 into the flush-mounted receiving means 8 and various receiving materials 22 contained in the plunger lock plug 18 for securing the plunger pin 16.

In another embodiment of the present invention, a fastening device wherein the flush-mounted receiving means 8 is continuously circumferential and remains stationary, and thereby fulfills the objective of providing a continuously flush-mounted fastening device, with and without the insertion of a plunger pin 16.

In yet another embodiment, the plunger pin 16 is secured by a receiving neck 24, a receiver 22 and a plunger cap 38 having a pull ring 40. The elements presented in this embodiment enhance the connection between the elements of the fastening device assembly and provide for securing more than one surface simultaneously.

In still another embodiment of the present invention, a fastening device including an attachment ring 30 embedded in the sheeted material holding means 10 and a retainer ring 36 for securing the sheeted material 12 to the attachment ring 30 is disclosed and claimed which has the object of securing the plunger pin 16 to the plunger lock plug 18.

Further, in another embodiment, the fastening device includes circumferential securing ribs 20 and water release indentations 28. The securing ribs 20 have the object of securing the plunger lock plug 18 to the surface 14 to prevent dislodging of the plunger lock plug 18, while the water release indentations 28 permit the release of water collected in the receiving means 8.

BRIEF DESCRIPTION OF THE DRAWINGS

The nature and extent of the present invention is clear from the following detailed description of the particular embodiments thereof, taken in conjunction with the appendant drawings, in which:

FIG. 2A is an exploded perspective view of the fastening device assembly;

FIG. 2B is a perspective of the elements of the fastening device unassembled;

DETAILED DESCRIPTION OF THE INVENTION

Figure 1:
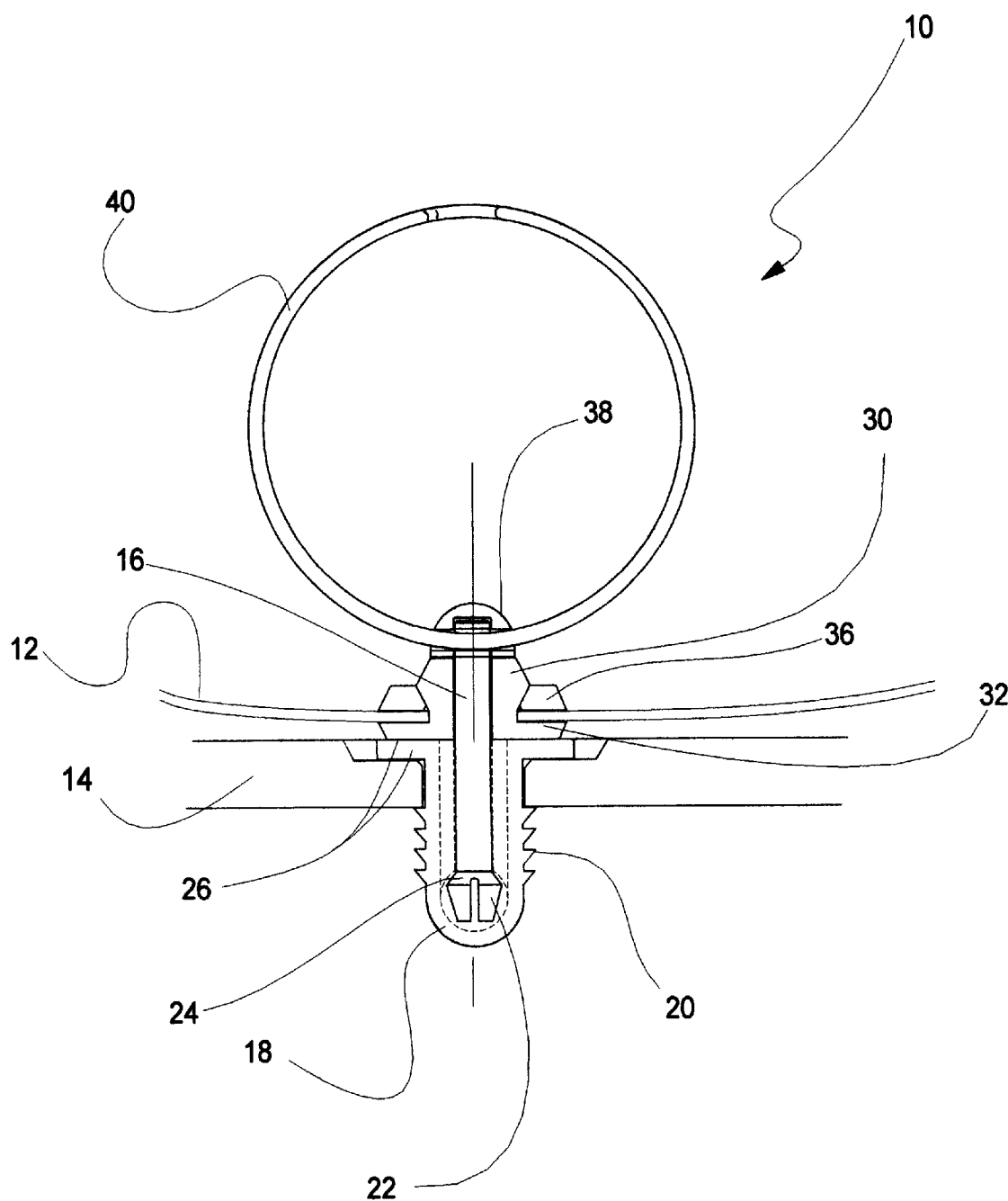
FIG. 1 is a cross-sectional view of the fastening device.

In accordance with a preferred embodiment of the present application, FIG. 1 discloses a fastening device, also referred to as a fastener assembly, generally denoted by the numeral 10. In the preferred embodiment, the fastening device 10 is utilized to secure a sheeted material 12 such as a canvas 12 to a surface 14 such as a boat hull 14. The fastening device 10 has multiple components for retaining canvas 12 therein while including portions for securing canvas 12 to boat hull 14. The functional portions of fastener assembly 10 reside in plunger pin 16, an elongated pin with a head 16d at an end 16c, for being received within a flush-mounted receiving means 8.

Plunger lock plug 18 includes an outside 18a, an inside 18b and securing ribs 20 continuously circumferentially extending preferably approximately midway through the axial dimension of the outside 18a. The securing ribs 20 act to secure the plunger lock plug 18 against the internal side 14b of boat hull 14, thereby discouraging slippage or "tearing out" of the plunger lock plug 18. A special drilling tool including a counter-sink adapted for specifically cutting holes into a boat may be used to secure the plunger lock plug into a boat deck. As appears in FIG. 1, the hole in the boat hull 14 includes a hole for receiving the plunger lock plug, as well as a counter-sinked recessed portion for holding the flush-mounted plunger lock plug face 19 of the plunger lock plug 18 against the external side 14a of boat hull 14. The flush-mounted plunger lock plug face 19 is continuously circumferential and defines a portion of the plunger lock plug 18 which enhances the stability of the plunger lock plug 18 and mates with flush-mounted capmate 32 of attachment ring 30.

A plunger pin 16 has a shaft 16a with a proximal end 16b and an opposing end 16c having a pin head 16d. In operation, pin head 16d of plunger pin 16 is inserted into plunger lock plug 18 with the plunger pin 16 being held within a restraining neck 24 of the plunger lock plug 18 and pin head 16d being held by a receiver 22 located inside 18b the plunger lock plug 18. The pin head 16d is indented with at least one slit 16e such that the pin head 16d is expandable and contractable. In the preferred embodiment, plunger lock plug 18 will be made of nylon, polymeric materials, urethanes, or any other material that is soft enough to receive the head of plunger pin 16, as well as having a sufficient amount of memory to swell back around the head of plunger pin 16 so that it cannot come out of the boat hull 14 without being pulled upwardly by an external force.

In day to day operation, it is anticipated that water will collect within receiver 22, thereby necessitating a means for releasing water. As presented in FIG. 2B, there must be some allowance for releasing the water. One possibility for providing water release is to install water release indentations 28 (see FIG. 2B), or any other means known in the art for releasing such water.

Viewing FIG. 2A in conjunction with FIG. 1, it is shown that there must be a hole in the canvas 12 near the edge of the canvas 12, where the canvas 12 is to be attached to the boat hull 14. By complement, attachment ring 30 and retainer ring 36 and capmate 32 each, respectively have coinciding centered guiding holes 30a, 36a and 32a through which plunger pin 16 may be guided. The canvas hole slips over attachment ring 30 which has a recessed section 34, and thereby, the canvas 12 is captured in recessed section 34 above flush-mounted capmate 32 by retainer ring 36. In the preferred embodiment, flush-mounted capmate 32 is a section of attachment ring 30 and is integrally attached to recessed section 34. Retainer ring 36 holds the canvas 12 in recessed section 34 and is made of a sufficiently rigid material such that it can be inserted down upon the sloping edge section 31 of attachment ring 30, catching under the lip 33 of attachment ring 30. Plunger pin 16 can be inserted through the middle of attachment ring 30 and into plunger lock plug 18.

Figure 3:
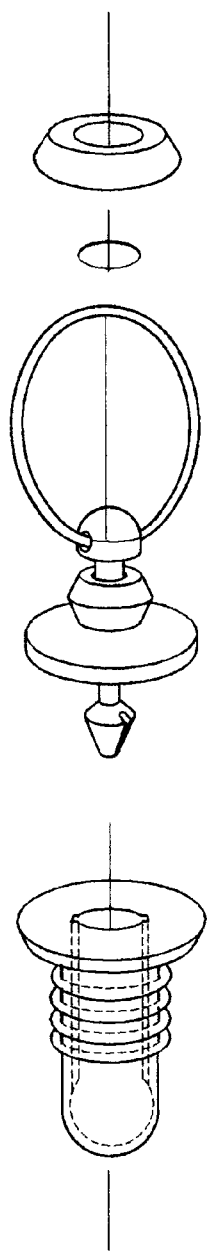
FIG. 3A is a perspective of the elements of the fastening device aligned for assembly into a surface.
FIG. 3B is a view at an intermediate stage prior to securing the plunger cap 38 to the plunger lock plug 18.
FIG. 3C illustrates the plunger pin 16 and plunger cap 38 inserted into the plunger lock plug 18 in final position.

With combined reference to FIG. 1, FIG. 3B and FIG. 3C, one observes the operation of the canvas fastener assembly 10. Plunger pin 16 is inserted through the canvas attachment ring 30, which has already been preferably permanently attached to canvas 12, yet is not required to be permanently attached. Plunger pin 16 is then inserted into the plunger lock plug 18 until the head of plunger pin 16 is received within receiver 22, the head 16d of plunger pin 16 having traveled downwardly past the restraining neck 24 of the plunger lock plug 18. An expandable and contractable pull ring 40 is sized to extend through the proximal end bore 16f of the plunger pin 16. On top of plunger pin 16 is plunger cap 38 having complementary and coinciding bores 38a, 38b drilled therein for receiving pull ring 40. FIGS. 3B and 3C illustrate plunger pin 16 as it is being inserted into its final position. Each pull ring 40 is used thereafter for removing each plunger pin 16, respectively, in order to remove the canvas 12 from the boat hull 14.

Figure 4:
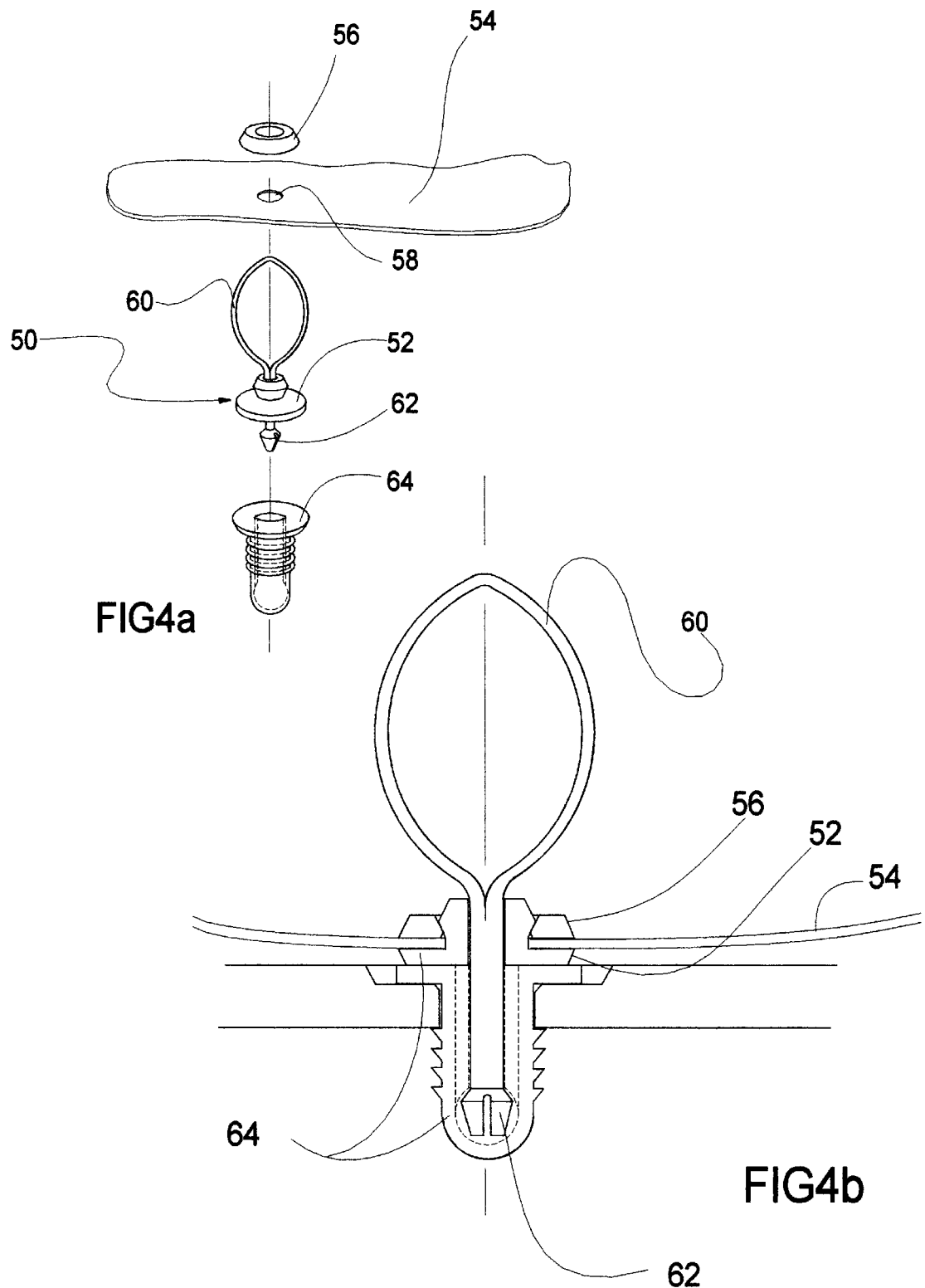
FIGS. 4A and 4B illustrate another embodiment of the present invention, including both perspective and cross sectional views of a unitary piece for the plunger pin.

Turning now to FIG. 4A, there can be seen yet another embodiment of the present invention with a one piece plunger assembly for receiving the sheet material and the retaining ring for securing the sheet material. The plunger assembly is generally denoted by the numeral 50, and includes the plunger cap 52 attached to finger-pull loop 60 and having plunger pin 62 attached thereto, all in a unitary piece. Loop 60 is flexible enough to be squeezed together and slipped through a hole 58 in the sheet material 54. Along with the hole 58 of the sheet material 54, loop 60 is also inserted through retaining ring 56, thereby securely attaching the sheet material to the plunger assembly. As before, the plunger assembly 50 will be inserted into plunger plug 64, which has already been embedded into a desired surface. FIG. 4B illustrates a cross sectional view of the present invention after the plunger pin 62 has been snapped into place within the plunger plug 64, securing the sheet material 54 to a surface. If it is desired to remove the sheet material, one simply inserts their finger through loop 60 and pulls with sufficient force as to dislodge the plunger pin 62 from within the plunger plug 64.

Figure 5:
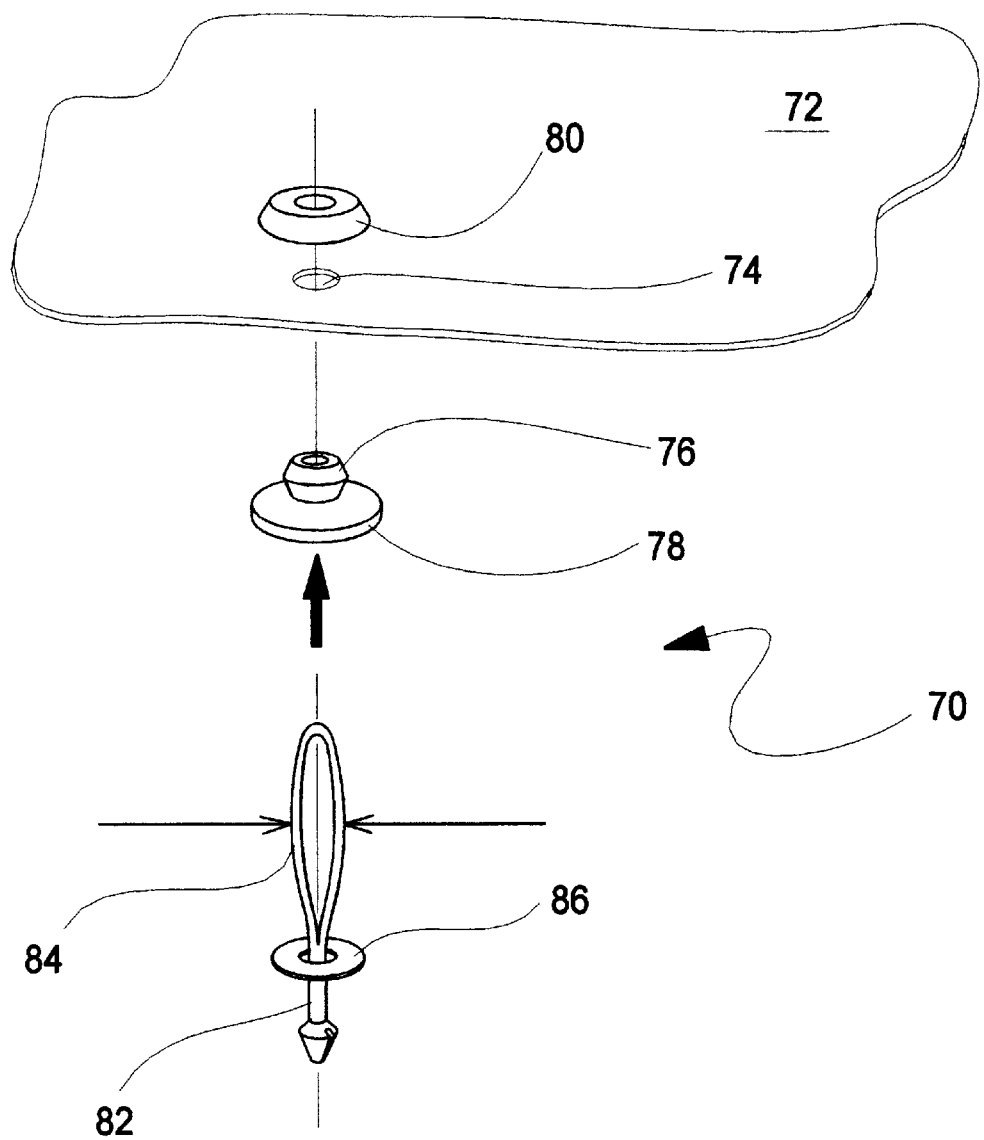
FIG. 5 shows a perspective view of yet another embodiment of the present invention, showing a multi-piece plunger configuration.

Referring now to FIG. 5, it should be noted that certain manufacturers may have difficulty in producing such a single piece plunger illustrated in FIGS. 4A and 4B. Therefore, yet another embodiment is disclosed and shown in FIG. 5 which is a multi-piece construction for ease of manufacture. The plunger pin assembly of the instant embodiment is generally designated by numeral 70. Plunger pin assembly 70 is designed to secure sheet material 72 to the retaining ring 76 by its cap 78, through hole 74 in the material. Plunger 82 includes a loop 84 and a retaining platform 86. Loop 84, shown squeezed together here, is inserted through the opening in retaining ring 76, hole 74 of the material, and thereafter the opening in retaining ring 80.

The loop is generally made of a material having a sufficient memory to spring back open after the insertion has taken place. Plunger pin assembly 70 can thereafter be inserted into the desired surface (not shown) to secure the attached sheet material.

It is also contemplated that securing such a device to a boat hull having a thickness of less than ⅜ inch can cause certain problems when a headliner has been glued to the underneath surface of the hull. It may not be advantageous to utilize the above embodiments for such as application, as they appear. For these instances, the entire assembly will need to be shortened up, and the expansion ribs for holding the plug within the hull of the boat can be used as a tap into the hull of the boat.

While the invention has been described in terms of specific embodiments, it will be appreciated that other embodiments could readily be adapted by one skilled in the art, without departing from the scope of the following claims. Accordingly, the scope of the invention is to be limited only by the following claims.

I claim:

1. A fastening device for fastening a sheeted material to a surface, comprising:

a plunger pin adapted to be attached to and extend through the sheeted material;

an attachment ring adapted to be permanently attached to and extend through the sheet material and through which the plunger pin extends, said attachment ring including an integral recessed section adapted to permanently receive the sheeted material;

a flush-mounted capmate section having a lower surface adapted to be complementary to the surface to which the sheeted material is to be fastened;

the recessed section being located between the attachment ring and the flush-mounted capmate; and a flush-mounted receiving means for receiving the plunger pin therein, the flush-mounted receiving means being adapted to be permanently embedded in the surface, for removably attaching the sheeted material to the surface.

2. The device of claim 1, wherein the flush-mounted capmate is integrally attached to the recessed section of the attachment ring and is part of the attachment ring.

3. The device of claim 1, further comprising a rigid retainer ring for securing the sheeted material in the recessed section of the attachment ring between the retainer ring and the flush-mounted capmate and above the flush-mounted capmate.

4. The device of claim 1, wherein the attachment ring, the retainer ring and the flush mounted capmate each, respectively, include complementary and coinciding centered guiding holes to receive the plunger pin therethrough.

5. The device of claim 4, wherein the plunger pin comprises a shaft having an integrally attached pin head, the pin head being conically tapered so as to guide the plunger pin through the guiding holes.

6. The device of claim 5, wherein the plunger pin is tapered, such that the pin head of the plunger pin is circumferentially larger than the plunger pin to prevent the plunger pin from sliding through the attachment ring.

7. The device of claim 5, wherein the pin head of the plunger pin is indented with at least one slit such that the pin head is expandable and contractible, enabling the plunger pin to be secured in the flush-mounted receiving means.

8. The device of claim 1, wherein the fastening device is made of a nylon material.

9. The device of claim 1, wherein the surface includes an external side and an internal side, and the flush-mounted receiving means further comprises a plunger lock plug which surrounds the receiving means and which includes a flush-mounted plunger lock plug face, such that when the plunger lock plug is embedded into the surface until it is flush with the surface, said flush-mounted plunger lock plug face mates with the flush-mounted capmate of the attachment ring.

10. The device of claim 9, wherein the plunger lock plug 18 further comprises a restraining neck located inside the receiving means of plunger lock plug in order to secure the plunger pin into the receiving means.

11. The device of claim 9, further comprising at least one securing rib attached to the outside of the plunger lock plug to prevent dislodging of the plunger lock plug.

12. The device of claim 11, wherein the at least one securing rib is continuously circumferential about the outside of the plunger lock plug.

13. The device of claim 9, wherein the flush-mounted receiving means further includes a receiver contained in the plunger lock plug 18.

14. The device of claim 13, wherein the receiver is a flexible and rigid material.

15. The device of claim 13, wherein the receiver is a nylon material.

16. The device of claim 13, wherein the receiver permits radial rotation of the plunger pin.

17. The device of claim 13, wherein the receiver is a spring-loaded metal.

18. The device of claim 13, further comprising at least one water release indentation located in proximity to the receiving means for releasing water collected within the receiver.

* * * * *